United States Patent
Gao et al.

(10) Patent No.: US 10,642,846 B2
(45) Date of Patent: May 5, 2020

(54) USING A GENERATIVE ADVERSARIAL NETWORK FOR QUERY-KEYWORD MATCHING

(71) Applicant: Microsoft Technology Licensing, LLC, Redmond, WA (US)

(72) Inventors: Bin Gao, Bellevue, WA (US); Ruofei Zhang, Mountain View, CA (US); Mu-Chu Lee, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 15/784,057

(22) Filed: Oct. 13, 2017

(65) Prior Publication Data

US 2019/0114348 A1 Apr. 18, 2019

(51) Int. Cl.
```
G06F 16/2457    (2019.01)
G06Q 30/02      (2012.01)
G06F 16/33      (2019.01)
G06N 3/08       (2006.01)
G06N 3/04       (2006.01)
G06F 16/23      (2019.01)
H04L 9/06       (2006.01)
```

(52) U.S. Cl.
CPC .... *G06F 16/24575* (2019.01); *G06F 16/2343* (2019.01); *G06F 16/334* (2019.01); *G06N 3/0445* (2013.01); *G06N 3/0454* (2013.01); *G06N 3/08* (2013.01); *G06N 3/082* (2013.01); *G06Q 30/0256* (2013.01); *H04L 9/0662* (2013.01)

(58) Field of Classification Search
CPC .................. G06F 16/24575; G06F 16/334
See application file for complete search history.

(56) References Cited

U.S. PATENT DOCUMENTS

| | | | |
|---|---|---|---|
| 2011/0071832 A1* | 3/2011 | Handa | G10L 15/26 704/246 |
| 2014/0236578 A1* | 8/2014 | Malon | G06F 17/28 704/9 |
| 2015/0074027 A1 | 3/2015 | Huang et al. | |
| 2015/0278200 A1 | 10/2015 | He et al. | |
| 2017/0031920 A1* | 2/2017 | Manning | G06F 16/904 |
| 2017/0091814 A1 | 3/2017 | Liu et al. | |

OTHER PUBLICATIONS

PCT Search Report and Written Opinion in PCT Application No. PCT/US2018/052775, dated Dec. 20, 2018, 17 pages.

(Continued)

*Primary Examiner* — Hosain T Alam
*Assistant Examiner* — Anthony G Gemignani

(57) ABSTRACT

A computer-implemented technique is described herein for providing a digital content item using a generator component. The generator component corresponds to a sequence-to-sequence neural network that is trained using an adversarial generative network (GAN) system. In one approach, the technique involves: receiving a query from a user computing device over a computer network; generating random information; generating a key term using the generator component based on the query and the random information; selecting at least one content item based on the key term; and sending the content item(s) over the computer network to the user computing device.

23 Claims, 10 Drawing Sheets

(56) References Cited

OTHER PUBLICATIONS

Wang, et al., "IRGAN: A Minimax Game for Unifying Generative and Discriminative Information Retrieval Models," in arXiv:1705.10513v1 [cs.IR], May 30, 2017, 10 pages.
Huang, et al., "Learning Deep Structured Semantic Models for Web Search using Clickthrough Data," in Proceedings of the 22nd ACM International Conference on Information & Knowledge Management, Oct. 2013, 6 pages.
Goodfellow, et al., "Generative Adversarial Nets," in arXiv:1406.2661v1 [stat.ML], Jun. 10, 2014, 9 pages.
Sutskever, et al., "Sequence to Sequence Learning with Neural Networks," in arXiv:1409.3215v3 [cs.CL], Dec. 14, 2014, 9 pages.
Chung, et al., "Empirical Evaluation of Gated Recurrent Neural Networks on Sequence Modeling," in arXiv:1412.3555v1 [cs.NE], Dec. 11, 2014, 9 pages.
Mirza, et al., "Conditional Generative Adversarial Nets," in arXiv:1411.1784v1 [cs.LG], Nov. 6, 2014, 7 pages.
Graves, Alex, "Generating Sequences With Recurrent Neural Networks," in arXiv:1308.0850v5 [cs.NE], Jun. 5, 2014, 43 pages.
Yu, et al., "SeqGAN: Sequence Generative Adversarial Nets with Policy Gradient," in arXiv:1609.05473v6 [cs.LG], Aug. 25, 2017, 11 pages.
Arjovsky, et al., "Wasserstein GAN," in arXiv:1701.07875v2 [stat.ML], Mar. 9, 2017, 32 pages.
Wu, et al., "Adversarial Neural Machine Translation," in arXiv:1704.06933v3 [cs.CL], Jun. 24, 2017, 11 pages.
"Reinforcement learning," available at <<https://en.wikipedia.org/wiki/Reinforcement_learning>>, Wikipedia online article, accessed on Sep. 19, 2017, 10 pages.
Mikolov, et al., "Efficient Estimation of Word Representations in Vector Space," in arXiv:1301.3781v3 [cs.CL], Sep. 7, 2013, 12 pages.

\* cited by examiner

USING A GENERATIVE ADVERSARIAL NETWORK FOR QUERY-KEYWORD MATCHING

BACKGROUND

Various computer platforms operate by mapping a user's input query to a key term (also referred to as a "keyword"), and then delivering a digital content item associated with the key term. For example, a computer-implemented item-serving platform may match a query that reads "Toyota Prius hybrid 2017" to the previously-established key term "Toyota Prius." The item-serving platform then delivers one or more content items that are associated with the key term, after performing various relevancy-related tests on the content items.

An item-serving platform can match a query to a key term using various techniques. For example, the item-serving platform can perform matching between queries and previously-established key terms using one or more lexical-based tests. Alternatively, or in addition, the item-serving platform can perform the matching using one or more semantic-based tests.

The above-identified approaches are not fully satisfactory because they slow the delivery of content items to users and/or make inefficient use of system resources. Some semantic-based matching algorithms can also produce suboptimal matching results.

SUMMARY

A computer-implemented technique is described herein for providing a digital content item using a generator component. The generator component corresponds to a sequence-to-sequence neural network that is trained using an adversarial generative network (GAN) system.

In one technique, for instance, the technique involves: receiving a query from a user computing device over a computer network; generating random information; generating a key term using the generator component based on the query and the random information; selecting at least one content item based on the key term; and sending the content item(s) over the computer network to the user computing device.

According to another illustrative aspect, the technique generates two or more key terms for a query based on two or more respective instances of random information.

According to another illustrative aspect, the GAN system includes the generator component in combination with a discriminator component. A training system trains the generator component to provide increasingly realistic key terms. The training system trains the discriminator component to progressively improve its ability to discriminate between real and "fake" key terms.

According to another illustrative aspect, the discriminator component includes a convolutional neural network.

According to illustrative technical advantages, the technique generates key terms from "scratch" using the generator component, without requiring the comparison of a query with actual bid key terms. The technique also does not require the mining of a historical log of query-key-term pairs. These characteristics enable the technique to generate key terms in an expeditious and resource-efficient manner. Moreover, the technique generates high-quality keywords, which contributes to the delivery of highly relevant content items to end users.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
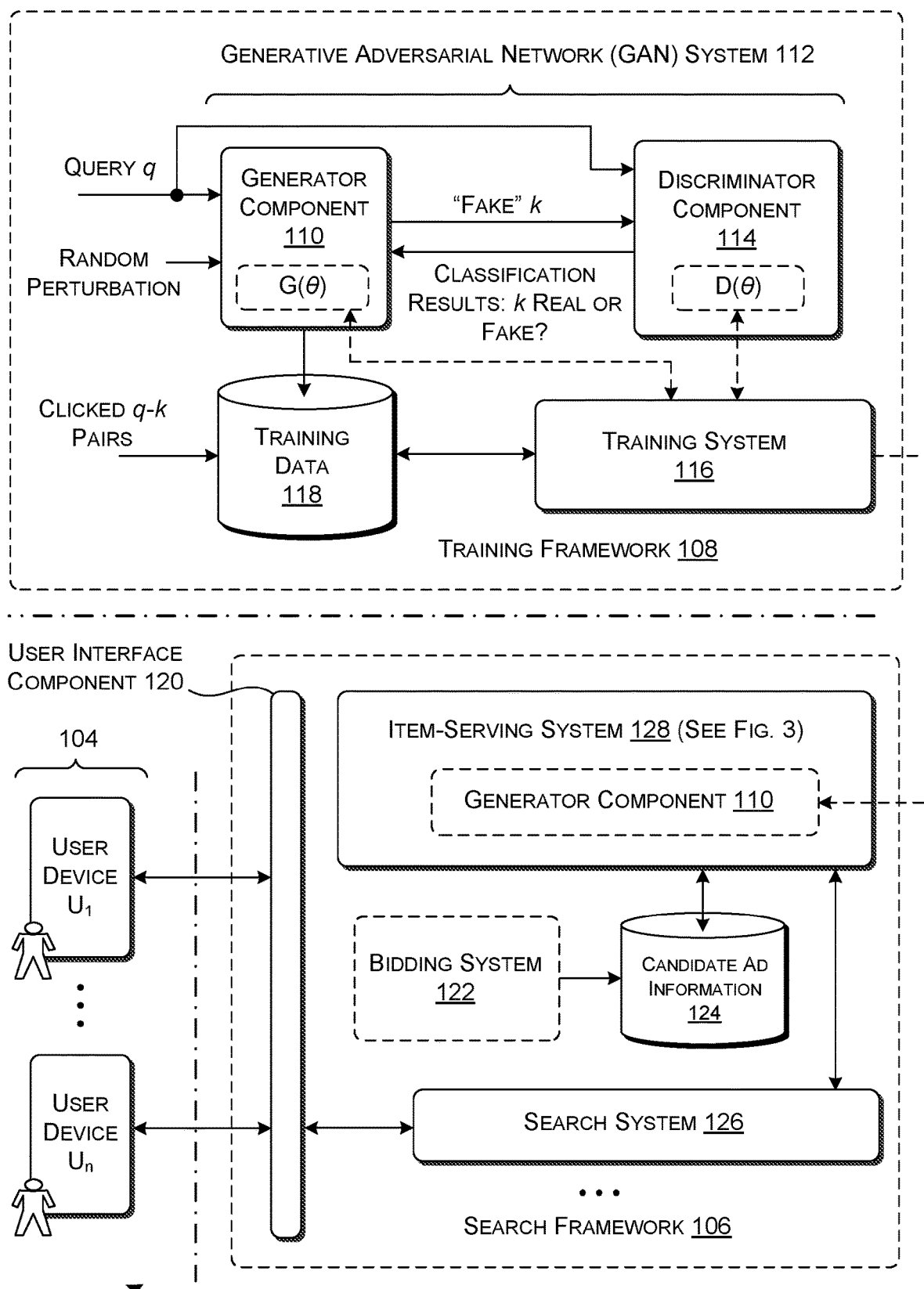
FIG. 1 shows a computing environment for delivering content items (e.g., digital ads) to user computing devices. The computing environment includes a training framework and a search framework.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for delivering digital content items using a generator component that is trained using a generative adversarial network (GAN) system. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component," "unit," "element," etc. refer to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

A.1. Overview

FIG. 1 shows a computing environment 102 for delivering digital content items to user computing devices 104. In the principal but non-limiting example set forth herein, the digital content items correspond to digital ads ("ads" for brevity) provided by a search framework 106. The search framework 106 delivers the ads to users in response to queries submitted by the users via the user computing devices 104. The search framework 106 performs this task by matching each query with one or more key terms, and then selecting one or more ads that have been associated, in advance, with the identified key term(s). Key terms are also referred to in the art as "keywords."

The principles set forth herein, however, are not limited to ad-serving applications. That is, the search framework 106 can deliver other kinds of content items using the query-to-key-term matching procedure described above. The other content items can include any one or more of: digital images (e.g., digital photographs), text documents, audio files, web pages, etc. The techniques described herein can also be applied to the generation of key terms in other contexts that do not necessarily terminate in providing an ad or other content item. For example, an ad-bidding platform can use the techniques to map an ad description to suggested key terms for consideration by an advertiser.

A key term, as used here, includes a lexical item made up of one or more lexical tokens. The lexical tokens may corresponds to words and/or other units of information. For example, the lexical item "Windows 10" corresponds to a key term having two tokens. The lexical item "2017 hybrid car compact" corresponds to another key term having four tokens.

The computing environment 102 includes two main parts: the search framework 106 and a training framework 108. The search framework 106 uses a generator component 110 to associate an input query with one or more key terms. In one implementation, the generator component 110 corresponds to a sequence-to-sequence neural network, e.g., composed of a recursive arrangement of Long Short-Term Memory (LSTM) units. The training framework 108 produces the generator component 110 through a machine-learning process. That is, the generator component 110 is controlled by a set of parameter values ($G(\theta)$). The training framework 108 generates those parameter values through an iterative machine-learning process.

This subsection will present an overview of the training framework 108, followed by the search framework 106. The next subsection (Subsection A.2) will provide further illustrative detail regarding the search framework 106. Subsection A.3 will provide additional illustrative detail regarding the training framework 108.

The training framework 108 includes a generative adversarial network (GAN) system 112. The GAN system 112, in turn, includes the abovementioned generator component 110, together with a discriminator component 114. The generator component 110, as said, is defined by a set of parameter values ($G(\theta)$), while the discriminator component 114 is defined by another set of parameter values ($D(\theta)$). A training system 116 successively updates the two sets of parameter values to achieve a training objective, described more fully in Section B.

In operation, the generator component 110 maps a representation of a query and an instance of random information to a key term. That key term can be referred to as a simulated, synthetic, false or "fake" key term because it is constructed via a machine-learned model, rather than pulled from a data store of actual "real" key terms that have selected a priori by advertisers. This explanation denotes each "fake" key term by the symbol k', and each real key term by the symbol k.

The discriminator component 114 receives a candidate key term and an associated candidate query, and determines whether that pairing is valid or invalid. For instance, consider the case in which a real query and a fake key term (k') are fed to the discriminator component 114, where the fake key term is produced by the generator component 110; here, the discriminator component 114 will judge whether the key term is real or fake.

The training system 116 can train the generator component 110 and the discriminator component 114 in two respective phases. The training system 116 repeats these phases a plurality of times until a training objective is achieved. Section B, with reference to FIG. 9, will describe one approach for training the generator component 110 and the discriminator component 114.

By way of overview of the explanation in Section B, the training system 116 can use a reinforcement learning technique to train the generator component 110. In that process, the training system 116 repeats the following operations: (1) the generator component 110 generates a key term; (2) the discriminator component 114 determines whether the key term is genuine or fake; and (3) the training system 116 adjusts the parameter values $G(\theta)$ of the generator component 110 based on the classification result of the discriminator component 114. In the terminology of reinforcement learning, the training system 116 treats the parameter values $G(\theta)$ of the generator component 110 as a policy to be refined. It treats the classification result of the discriminator component 114 as a reflection of the value of an action that has been taken by the generator component 110. The action, in turn, corresponds to the generator component's generation of a synthetic key term k'.

The training system 116 can train the discriminator component 114 by collecting a plurality of training pairs in a data store 118. The pairs include examples of "real" queries and key terms. Each such pairing is retrieved from a click log. That is, the query in the pairing corresponds to an actual query (q) that at least one user has submitted on a prior occasion. The key term (k) in the pairing corresponds to a key term that is associated with an actual ad that the user has clicked on or otherwise selected. Other pairings include examples of real queries and fake (or synthetic) key terms. Each such pairing (q, k') is produced by the generator component 110 using its current set of parameter values $G(\theta)$. Optionally, other pairings can include associations of fake queries and real key terms. The training system 116 uses the thus-compiled training set to update the parameter values $D(\theta)$ of the discriminator component 114 via any machine-learning technique.

Overall, the training system 116 iteratively improves the ability of the generator component 110 to produce synthetic key terms that resemble the actual distribution of "real" key terms in a data set. The training system 116 also iteratively improves the ability the discriminator component 114 to distinguish between real and fake key terms. As an end result, the generator component 110 will eventually produce synthetic key term that are virtually indistinguishable from the real key terms. Once this objective is achieved, the training system 116 will install the trained generator component 110 (as defined by the trained set of parameter values $G(\theta)$) in the search framework 106.

The GAN system 112 is said to be "adversarial" because the generator component 110 attempts to "fool" the discriminator component 114, while the discriminator component 114 attempts to thwart that deception by improving its ability to discriminate between true and fake key terms.

In one implementation, the training system 116 performs its training in an offline training process on a periodic basis. In another implementation, the training system 116 continuously updates the generator component 110 as a background process.

The search framework 106 includes a user interface component 120 that enables users to interact with the search framework 106. For example, the user interface component 120 can provide a user interface presentation that allows a user to input a query to the search framework 106. The search framework 106 may generate search results in response to the query, and deliver those search results to the user via the user interface presentation. The user interface presentation may correspond to a graphical user interface presentation and/or a voice interface (e.g., as provided by voice recognition functionality and voice synthesis functionality, etc.).

An ad-bidding system 122 allows advertisers to bid on key terms. The ad-bidding system 122 can govern this process using any technique. In one approach, the ad-bidding system 122 allows an advertiser to specify all aspects of a digital ad, such as its title, its body, its URL, etc. The ad-bidding system 122 also allows the advertiser to specify one or more key terms to be associated with the ad, as well as a financial bid associated with each such key term. The search framework 106 will use the bid specified by the advertiser, together with other factors, in determining the manner in which the corresponding ad is presented on a page, if at all. For example, the search framework 106 will use the bid as one factor in determining the order in which the ad is presented relative to other ads. The search framework 106 will also use the bid as one factor in determining the price to be paid by the advertiser when an end user clicks on the ad, and/or when some other ad-serving event occurs.

More generally, the search framework 106 can use any technique to associate key terms with content items. In other contexts, for example, the search framework 106 can receive a user's specification of a key term without a bidding process. For example, a user can input a digital photograph to an online repository; in connection therewith, the user can also specify one or more key terms associated with that digital photograph.

The ad-bidding system 122 stores candidate ad information in a data store 124. The candidate ad information can specify all aspects of ads created by the advertisers, such as the ad content associated with each ad and the selected key term(s) associated with each ad. The data store 124 may correspond to a single repository of information, or it may represent two or more repositories of linked information.

In one implementation, the search framework 106 devotes a search system 126 for generating search results in response to a user's input query. The search framework 106 uses an item-serving system 128 (henceforth referred to as an ad-serving system 128) for delivering ads in response to the user's input query. In some cases, the search framework 106 integrates the search results (provided by the search system 126) and the identified ads (provided by the ad-serving system 128) into a single user interface presentation, as described more fully below in connection with the explanation of FIG. 2.

The search system 126 can use any algorithm to generate search results. To cite merely one example, the search system 126 can use a neural network to map the user's query into a first vector in a low-dimensionality semantic space. The search system 126 can map each candidate item (e.g., a web page, etc.) into a second vector in the semantic space. The search system 126 can determine the relevance of the query to the candidate item by determining the distance between the first and second vectors, e.g., using a cosine similarity metric.

Subsection A.2 provides a detailed explanation of the operation of the ad-serving system 128. By way of overview, in a first phase of processing, the ad-serving system 128 uses the trained generator component 110 to match the user's input query to one or more synthetic key terms. The ad-serving system 128 identifies the ads that are associated with those key terms. The ad-serving system 128 then ranks those ads with respect to various considerations (such as ad relevance, click prediction, bid, etc.). The ad-serving system 128 then delivers a subset of the most highly ranked ads to the user.

Figure 2:
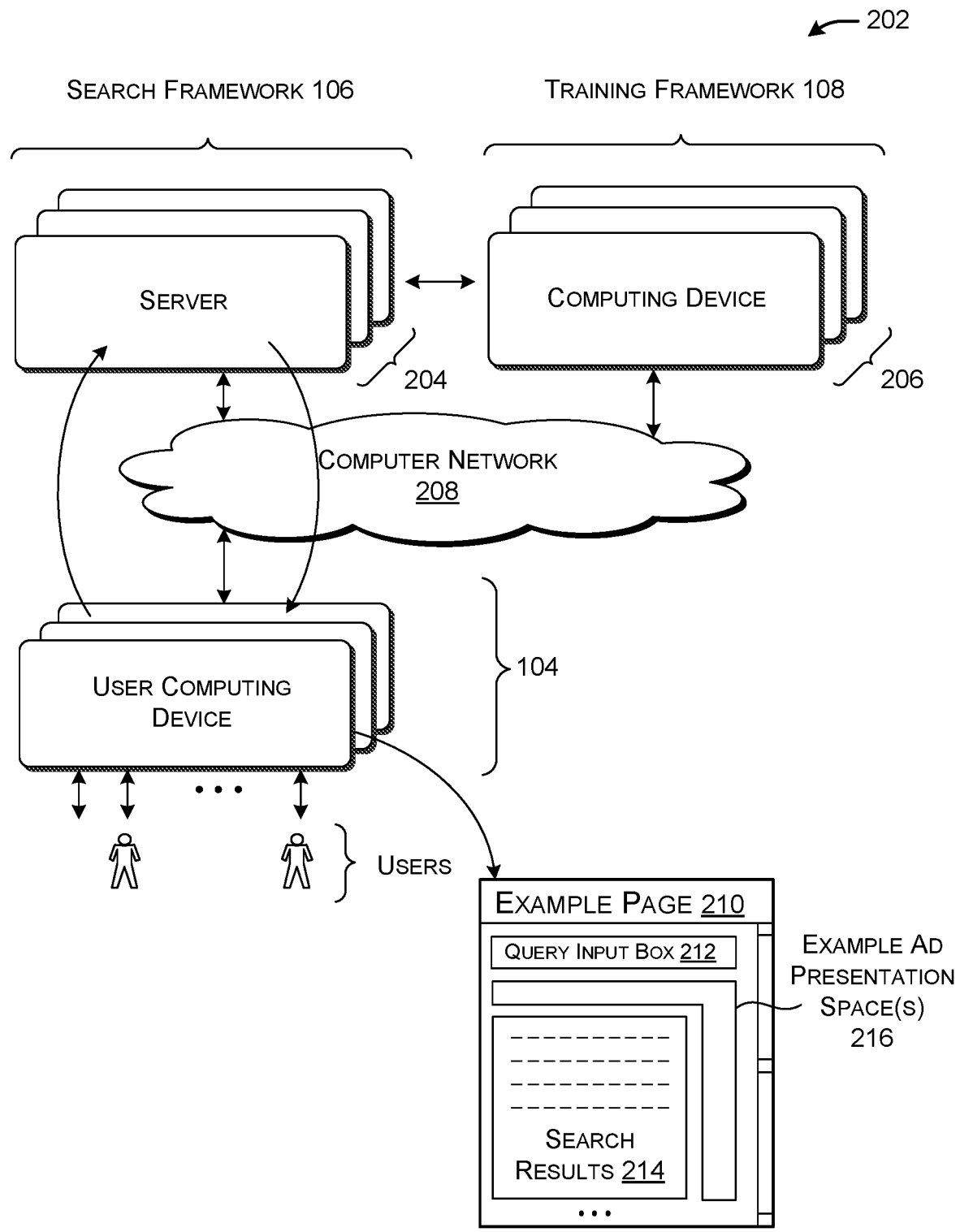
FIG. 2 shows computing equipment that can be used to implement the computing environment of FIG. 1.

FIG. 2 shows computing equipment 202 that can be used to implement the computing environment 102 of FIG. 1. In one implementation, the computing equipment 202 can include one or more servers 204 that implement the search framework 106 and one or more servers 206 (and/or other type(s) of computing devices) that implement the training framework 108. Although not shown, the search framework 106 can optionally also devote separate resources for the search system 126 and the ad-serving system 128.

A plurality of user computing devices 104 interact with the server(s) 204 of the search framework 106 via a computer network 208. Any user computing device can correspond to, without limitation, any of: a traditional desktop computing device; a laptop computing device; a smartphone; a tablet-type computing device; a set-top box; a game console; a virtual/augmented reality device; a wearable computing device, and so on. Any user computing device can interact with the user interface component 120 of the search framework 106 via a browser program. The computer network 208 can correspond to a wide area network (e.g., the Internet), a local area network, one or more point-to-point links, etc.

FIG. 2 also shows an example user interface page ("page") 210 provided by the search framework 106. The page 210 includes an input box 212 within which a user may type his or her input query. The page 210 also includes a main display section 214 that provides the search results provided by the search system 126. The page 210 also includes one or more peripheral spaces 216 that present the ads delivered by the ad-serving system 128. Alternatively, or in addition, the page 210 can integrate ad information within the main display section 214.

In one implementation, each ad corresponds to a text snippet that advertises a product or service, or which provides some other message. Each text snippet is associated with a URL. The user's browser will direct the user to a target site or resource when the user clicks a text snippet (and its underlying URL). For instance, the user's browser may direct the user to a web site associated with an advertiser; that website may present further information regarding the product or service being advertised.

A.2. The Ad-Serving System

Figure 3:
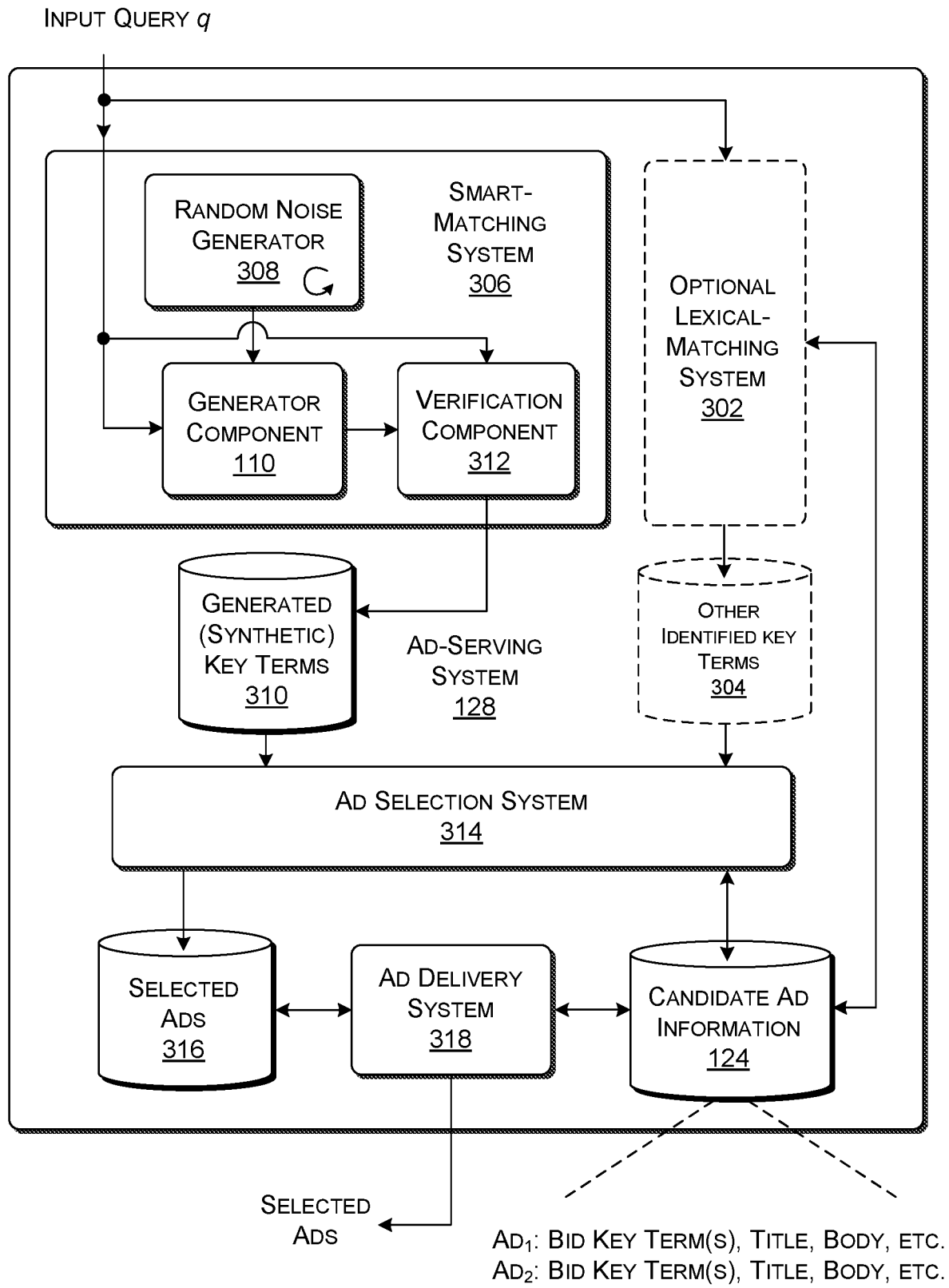
FIG. 3 shows one implementation of an ad-serving system, which is a component of the search framework of FIG. 1.

FIG. 3 shows one implementation of the ad-serving system 128. This subsection will describe the operation of the ad-serving system 128 in the context of its processing of a single query (q) submitted by an end user.

In a first phase of operation, the ad-serving system 128 associates the query with one or more key terms. In part, the ad-serving system 128 may optionally use at least one lexical-matching system 302 to perform this task. The lexical-matching system 302 selects key terms in the data store 124 based on a lexical comparison of the input query with the key terms. For example, the lexical-matching system 302 can select key terms that exactly match one or more words in the query. Alternatively, or in addition, the lexical-matching system 302 can select key terms that are assessed as being similar to the query, e.g., as assessed based on any metric of similarity, such as edit distance, etc. The lexical-matching system 302 stores the key terms that it identifies in a data store 304. Those key terms correspond to real key terms that have been actually bid by advertisers, rather than synthetic key terms. Alternatively, the ad-serving system 128 can entirely omit the lexical-matching system 302.

The ad-serving systems 128 also includes a smart-matching system 306 for selecting key terms based on a consideration of the semantic similarity between the input query and the identified key terms. One such technique employs the generator component 110 introduced in Subsection A.1. As explained, the generator component 110 corresponds to a sequence-to-sequence neural network that is trained (in a previous training phase) by the training framework 108 via the GAN system 112.

Figure 4:
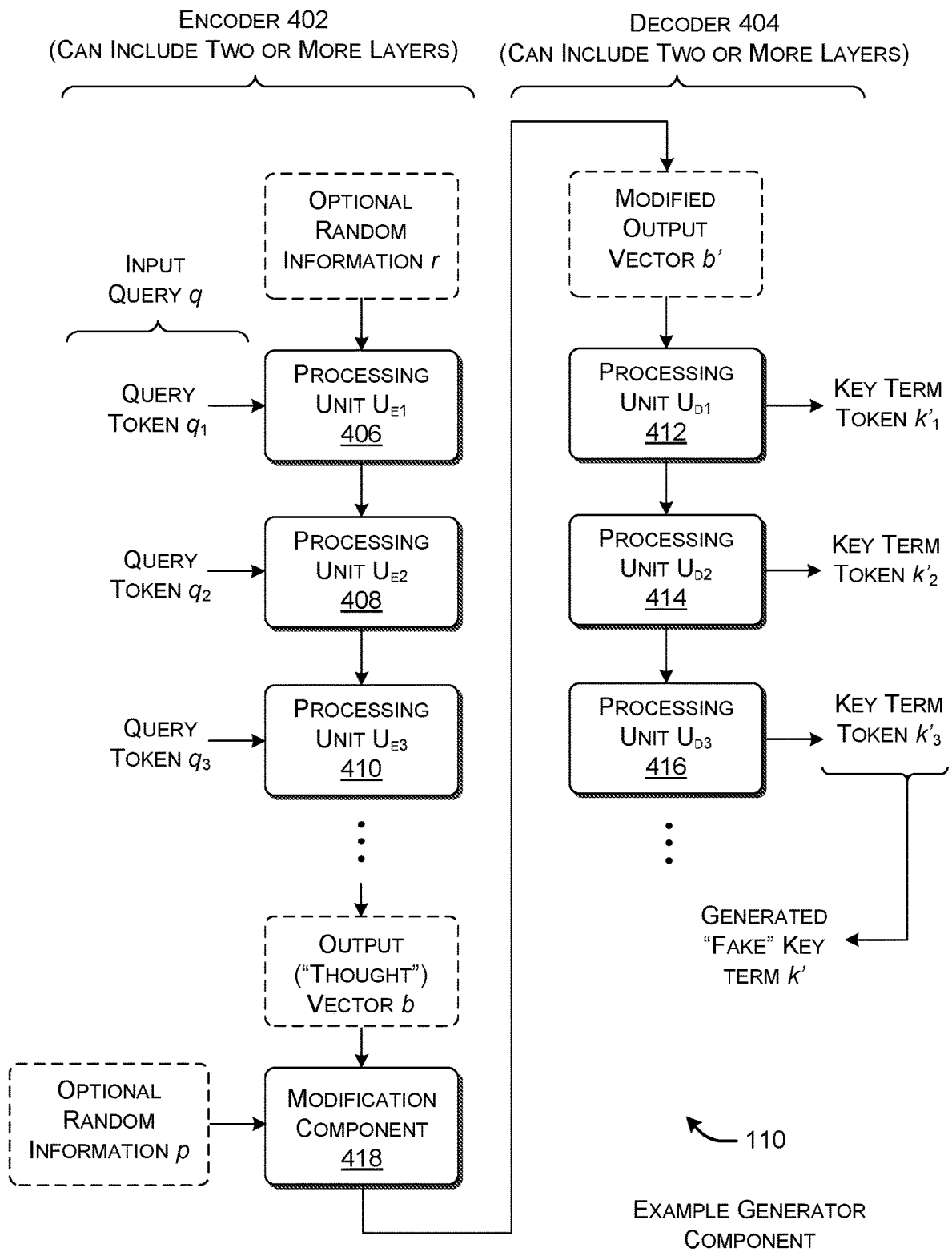
FIG. 4 shows one implementation of a generator component, which is a component of the ad-serving system of FIG. 3.
Figure 5:
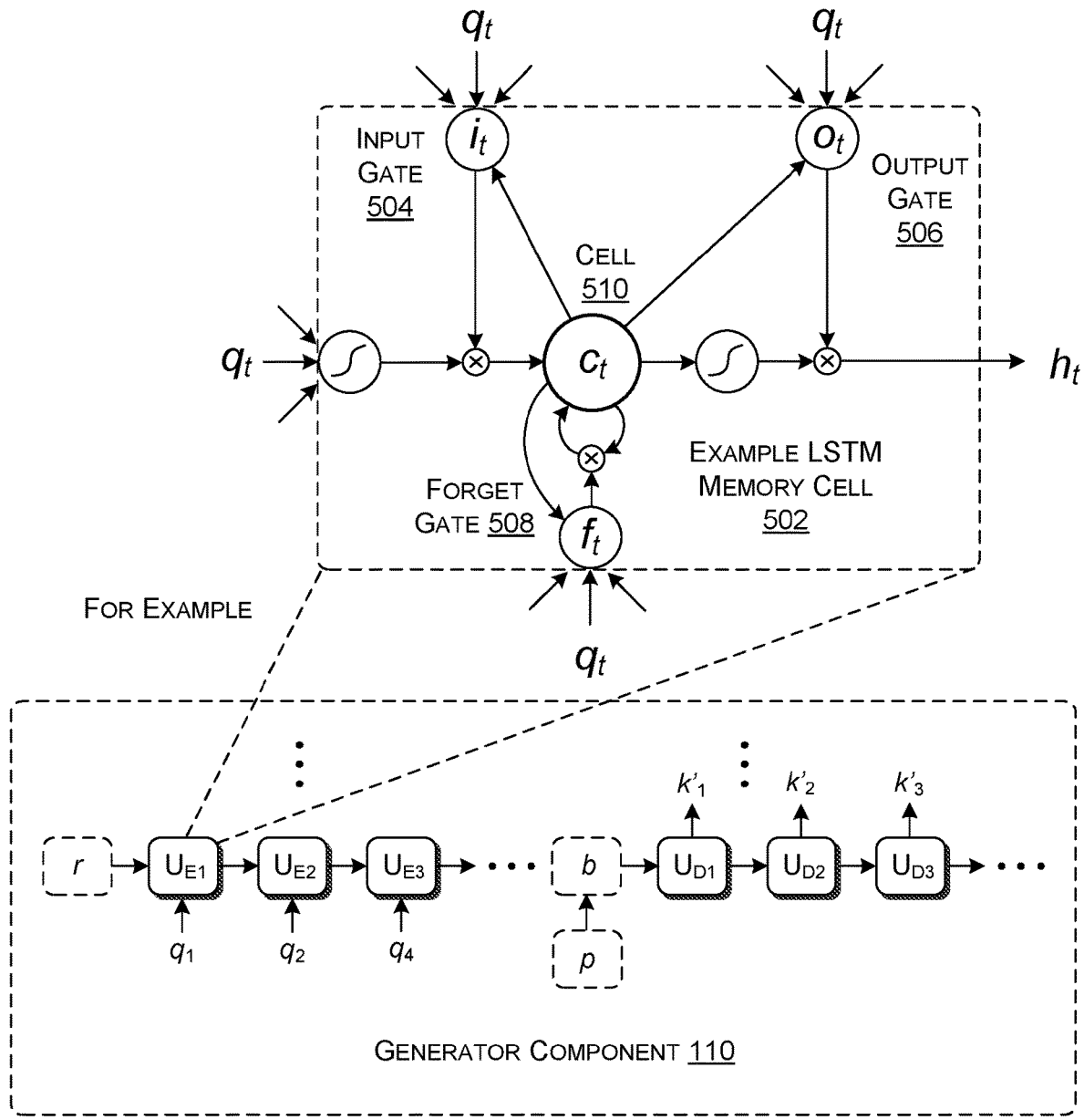
FIG. 5 shows one implementation of the generator component of FIG. 4.

In operation, a random noise generator 308 generates a noise vector that contains random noise information, e.g., Gaussian noise. The generator component 110 maps the random noise information together with the query into a single key term. The smart-matching system 306 can repeat this process one or more times by generating one or more new instances of random information, and generating a new key term for each instance of the random information (together with the same key term). For example, assume that the smart-matching system 306 is configured to generate five key terms based on a single query. The generator component 110 outputs five distinct key terms upon being fed five different instances of noise information, together with the same query. FIGS. 4 and 5 provide additional information that explains how the generator component 110 performs this task. Alternatively, the smart-matching system 306 can employ plural instances of the generator component 110 that generate plural key terms in parallel.

The smart-matching system 306 stores the key terms that it generates in a data store 310. The key terms are synthetic or "fake" key terms because they are generated by the generator component 110 without consulting the actual bid key terms in the data store 124. But these key terms should nevertheless have good quality because the training system 116 has trained the generator component 110 to produce key terms that closely approximate actual key terms. This means that there is a high likelihood that the generated key terms will exactly match the actual bid key terms in the data store 124, or be closely similar to those actual bid key terms.

The smart-matching system 306 can optionally incorporate a key term verification component 312. The verification component 312 can convert the input query and a candidate key term into vector form using any technique described below. The verification component 312 can then determine a similarity score which measures the similarity between the two vectors using any similarity metric, such as cosine similarity. The verification component 312 can then exclude the key term if it has a similarity score below an environment-specific threshold value. This operation will help exclude irrelevant key terms and their associated ads.

An ad selection system 314 identifies a set of ads in the data store 124 to be presented to the user based on the key terms specified in the data stores (304, 310), and based on the query and other contextual factors. The ad selection system 314 can perform this task using any technique. In one technique, the ad selection system 314 can identify a master set of ads, each of which is associated with one or more of the identified key terms in the data stores (310, 304). For example, assume that the data stores (310, 304) identify three key terms associated with a particular query: (1) Toyota Prius; (2) Toyota hybrid; and (3) fuel-efficient car 2017. The ad selection system 314 generates a master set of ads, where each such ad has been previously associated with at least one of these three key terms.

In another technique the ad selection system 314 performs additional processing on the master set of ads described above. For example, the ad selection system 314 can rank the ads in the subset based on their assessed appropriateness, and then select the n most relevant ads to present to the user, and/or it can select those ads that have ranking scores above a prescribed threshold. The ad selection system 314 can rank each candidate ad based on several factors, such as, but not limited to: (a) the relevance of the candidate ad to the query; (b) a prediction of the likelihood that a user will click on the candidate ad; (c) the amount of money the advertiser has bid for a key term associated with the candidate ad, and so on. The ad selection system 314 can compute a relevance score and a click prediction score using well known techniques, e.g., using respective machine-learned models.

To cite merely one example, the ad selection system 314 can first determine a relevance score for each candidate ad, which measures the relevancy of the ad to the query. The ad selection system 314 can perform this task in the same manner that the search system 126 computes the relevance of any candidate document to a query. The ad selection system 314 can then exclude those ads having relevancy scores below a prescribed threshold. The ad selection system 314 can then compute a click prediction score for each remaining ad using a machine-learned model. The ad selection system 314 can then determine the rank of each remaining ad by multiplying its click prediction score by its associated bid amount.

The ad selection system 314 can store information that identifies the selected ads in a data store 316. An ad delivery system 318 can then deliver the identified ads to the user. Note that FIG. 3 shows that the ad delivery system 318 is a part of the ad-serving system 128. But in another implementation, the search system 126 can implement the ad delivery system 318.

FIG. 4 shows one implementation of the generator component 110. The generator component 110 corresponds to a sequence-to-sequence neural network model that maps an input series of tokens (corresponding to the query) to an output sequence of tokens (corresponding to a synthetic or "fake" key term).

As used herein, a token corresponds to a part of a sequence. For example, each token of a query may correspond to a word or other distinct part of the query. For example, the tokens for the query "Washington Redskins 2017" include "Washington," "Redskins," and "2017." In other implementations, the query's tokens can correspond to some other units, such as the distinct n-grams that compose the query, phonetic tokens, etc.

The generator component 110 includes an encoder 402 and a decoder 404. The encoder 402 maps the input query (together with random information) into an output vector b, also referred to as a "thought vector." The decoder 404 maps the output vector b into a key term k'. The encoder 402 includes a first collection of processing units (e.g., processing units 406, 408, 410, . . . ) for processing respective query tokens. The decoder 404 includes a second collection of processing units (e.g., processing units 412, 414, 416, . . . ) for providing respective key term tokens.

Overall, the generator component 110 corresponds to a recursive neural network that includes a chain of processing units. That is, in this framework, each processing unit outputs a hidden state vector h(t) at a time step t. That hidden state vector constitutes an input to a next processing unit in the chain of processing units. For example, the processing unit 406 generates a hidden state vector that serves as an input to the processing unit 408. The output vector b constitutes the hidden state vector that is output by the last processing unit of the encoder 402. The output vector b, in turn, serves as an input to the first processing unit 412 of the decoder 404.

Note that FIG. 4 shows the recursive neural network as having a single chain of processing units. But other implementations can include a recursive neural network having plural stacked chains. In that configuration, the processing units pass information "up" through the stack of chains, as well as across each chain.

The smart-matching system 306 can express each query token in vector form using any technique. In a first approach, the smart-matching system 306 can map a word (such as the word "hybrid") to a "one-hot" vector. That one-hot vector has a dimensionality the size of the natural language (e.g., English) used to express the token, and a series of slots associated with respective words. The smart-matching system 306 sets a "1" entry in a slot associated with the word that is being represented (e.g., "hybrid"), and a "0" entry for other slots.

In a second approach, the smart-matching system 306 can map each word into a letter-n-gram vector. The smart-matching system 306 performs this task by passing a window having a size of n letters over the word, and identifying the distinct n-letter subsets that compose the word. For example, the smart-matching system 306 would identify the following letter-trigrams in the word "hybrid": "#hy," "hyb," "ybr," "bri," "rid," and "id#," where the "#" is a word demarcation symbol added to the beginning and end of the word. The smart-matching system 306 can then create a vector that has a dimensionality the size of the number of distinct letter-trigrams in a natural language, with each slot of the vector representing a particular letter-trigram. The smart-matching system 306 sets a value "m" for each slot of the vector that identifies a number of times a corresponding letter-trigram appears in the word being represented. For instance, the smart-matching system 306 would create a vector having a "1" entry for the slots associated with the letter-trigrams "#hy," "hyb," "ybr," "bri," "rid," and "id#," and a "0" entry for all other entries.

In a third approach, the smart-matching system 306 can include any type of machine-learned model that maps an initial vector-representation of a word to lower-dimensionality representation of the word. For example the machine-learned model can correspond to any type of neural network. Background information on the isolated topic of representing words as vectors can be found, for instance, in Mikolov, et al., "Efficient Estimation of Word Representations in Vector Space," in arXiv:1301.3781v3 [cs.CL], Sep. 7, 2013, 12 pages Still other techniques can be used to represent a word in vector form. The above-described strategies are set forth by way of illustration, not limitation.

Similarly, the decoder 404 can be trained to produce output vectors which represent the tokens of the key term. For example, the decoder 404 can produce "one-hot" output vectors, where the "hot" entry (e.g., the "1" entry) in the vector identifies the word in the natural language vocabulary that the vector represents.

In one implementation, the smart-matching system 306 feeds respective input tokens (associated with input query tokens) to respective processing units of the encoder 402, e.g., by feeding the query token $q_1$ to the first processing unit 406, by feeding the query token $q_2$ to the second processing unit 408, and so on. More generally, the smart-matching system 306 dynamically expands the number of processing units in the encoder 402 to accommodate the size of the query. The decoder 404 outputs a complete key term when one of its processing units outputs a special end token, representing the end of the key term's sequence. At that time, each processing unit of the decoder 404 outputs a distinct token of the key term. The smart-matching system 306 can also dynamically expand the number of processing units in the decoder 404 to accommodate key terms having different token lengths.

Finally, note that the generator component 110 can inject random information into the encoder 402 at different junctures. (Recall that the random noise generator 308 of FIG. 3 generates the random information.) In a first implementation, the generator component 110 injects the random information as an input hidden state to the first processing unit 406 of the encoder 402. That is, the first processing unit 406 receives a random vector r as the initial input hidden state, where the random vector r expresses the random information generated by the random noise generator 308.

In a second implementation, the generator component 110 can use the random information to perturb the output vector b, which represents the output of the last processing unit of the encoder 402. That is, the encoder 402 includes a modification component 418. The modification component 418 receives the output vector b as a first input, and a random vector p as a second input. The modification component 418 can modify the output vector b by the random vector p using any technique (e.g., by adding the two vectors together, or concatenating them together, etc.), to produce a modified thought vector b'.

In a third implementation, the generator component 110 can inject both the random vector r and the random vector p. More generally, the generator component 110 can inject random information at any juncture(s) along the chain of its processing units.

Advancing to FIG. 5, each processing unit in the generator component 110 can correspond to a Long Short-Term Memory (LSTM) unit, or a Gated Recurrent Unit (GRU), or some other neural network unit. General background information regarding the isolated topic of LSTM architecture can be found in Alex Graves, "Generating Sequences With Recurrent Neural Networks," in arXiv:1308.0850v5 [cs.NE], Jun. 5, 2014, 43 pages. General background information regarding the isolated topic GRU architecture can be found in Chung, et al., "Empirical Evaluation of Gated Recurrent Neural Networks on Sequence Modeling," in arXiv:1412.3555v1 [cs.NE], Dec. 11, 2014, 9 pages.

For example, FIG. 5 shows one illustrative type of LSTM unit 502, which includes an input gate 504, an output gate 506, a forget gate 508, and a cell 510. With reference to the encoder 402, the LSTM unit 502 processes signals in a manner specified by the following equations:

$$i_t = \sigma(W_{qi}q_t + W_{hi}h_{t-1} + W_{ci}c_{t-1} + b_i) \quad (1)$$

$$f_t = \sigma(W_{qf}q_t + W_{hf}h_{t-1} + W_{cf}c_{t-1} + b_f) \quad (2)$$

$$c_t = f_t c_{t-1} + i_t \tan h(W_{qc}q_t + W_{hc}h_{t-1} + b_c) \quad (3)$$

$$o_t = \sigma(W_{qo}q_t + W_{ho}h_{t-1} + W_{co}c_t + b_o) \quad (4)$$

$$h_t = o_t \tan h(c_t). \quad (5)$$

In this set of equations, t refers to a current time step, q refers to a vector that represents a token of the input query, and i, o, f, c represent vectors associated with the input gate 504, the output gate 506, the forget gate 508, and the cell 510, respectively. h represents a vector associated with the hidden state. σ represents a logistic sigmoid function. The various W and b symbols represent machine-learned weighting parameter values and bias information, with subscripts associated with the above-defined symbols.

A.3. The Training Framework

Figure 6:
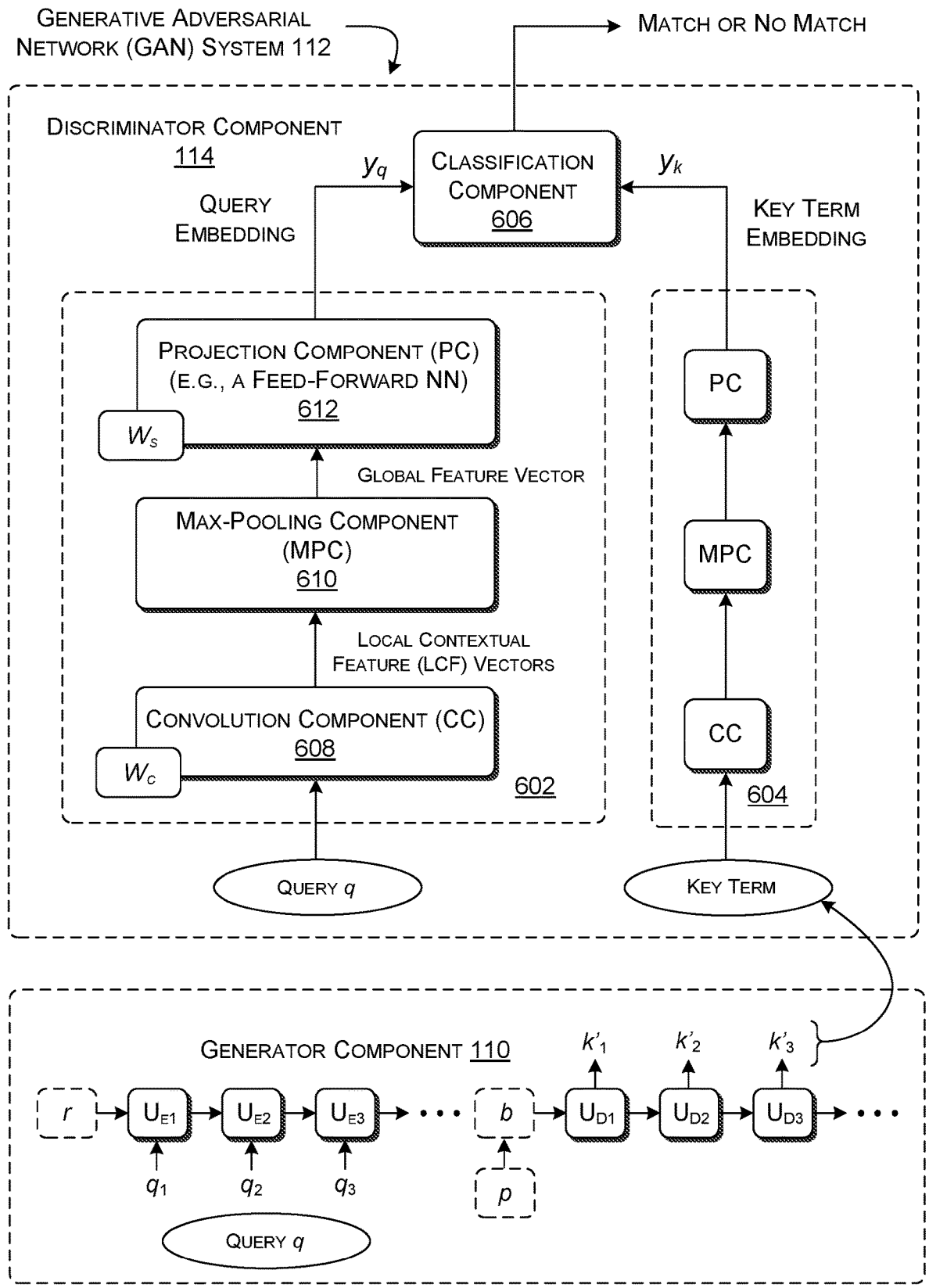
FIG. 6 shows one implementation of a generative adversarial network (GAN) system. The GAN system is used by the training framework of FIG. 1 to train the generator component of FIG. 4.

FIG. 6 shows one implementation of the GAN system 112 which was introduced in FIG. 1. The GAN system 112 includes the sequence-to-sequence generator component 110 described in the previous subsection, together with the discriminator component 114.

The discriminator component 114 may correspond to any machine-learned model. In the example shown in FIG. 6, the discriminator component 114 includes a Convolutional Neural Network (CNN). In other cases, the discriminator component 114 can use any other type of deep neural network, a Support Vector Machine (SVM), a logistic regression classifier, etc.

More specifically, the discriminator includes two CNNs that operate in parallel on different input vectors. A first CNN 602 transforms an input candidate query into a first vector $y_q$ in a low-dimensionality semantic space. The candidate query can correspond to an actual query q or a "fake" query (q'). A second CNN 604 maps a candidate key term into a second vector $y_k$ in the semantic space. The candidate key term can correspond an actual key term (k) or a "fake" key term (k') generated by the generator component 110.

A classification component 606 classifies the pairing of the query and the key term as either valid or invalid. The classification component 606 will determine that the pairing of the query and key term is valid (classification result="1") when both query and key term are assessed as being real. The classification component 606 will classify the pairing as invalid (classification result="0") for other combinations, including the combination of a real query (q) and fake key term (k'), and the combination of a fake query (q') and a real key term (k). The classification component 606 can make this judgment using any technique, such as by computing the cosine similarity between $y_q$ and $y_k$ and comparing the resultant similarity score to a threshold value. Or the classification component 606 can use a separate machine-learned classifier model to make this decision.

Although not shown, in other implementations, the discriminator component 114 can include a single CNN. The single CNN can receive a single vector that represents a concatenation (or some other combination) of a candidate query and a candidate key term. The single CNN maps the input vector to a classification result.

Figure 7:
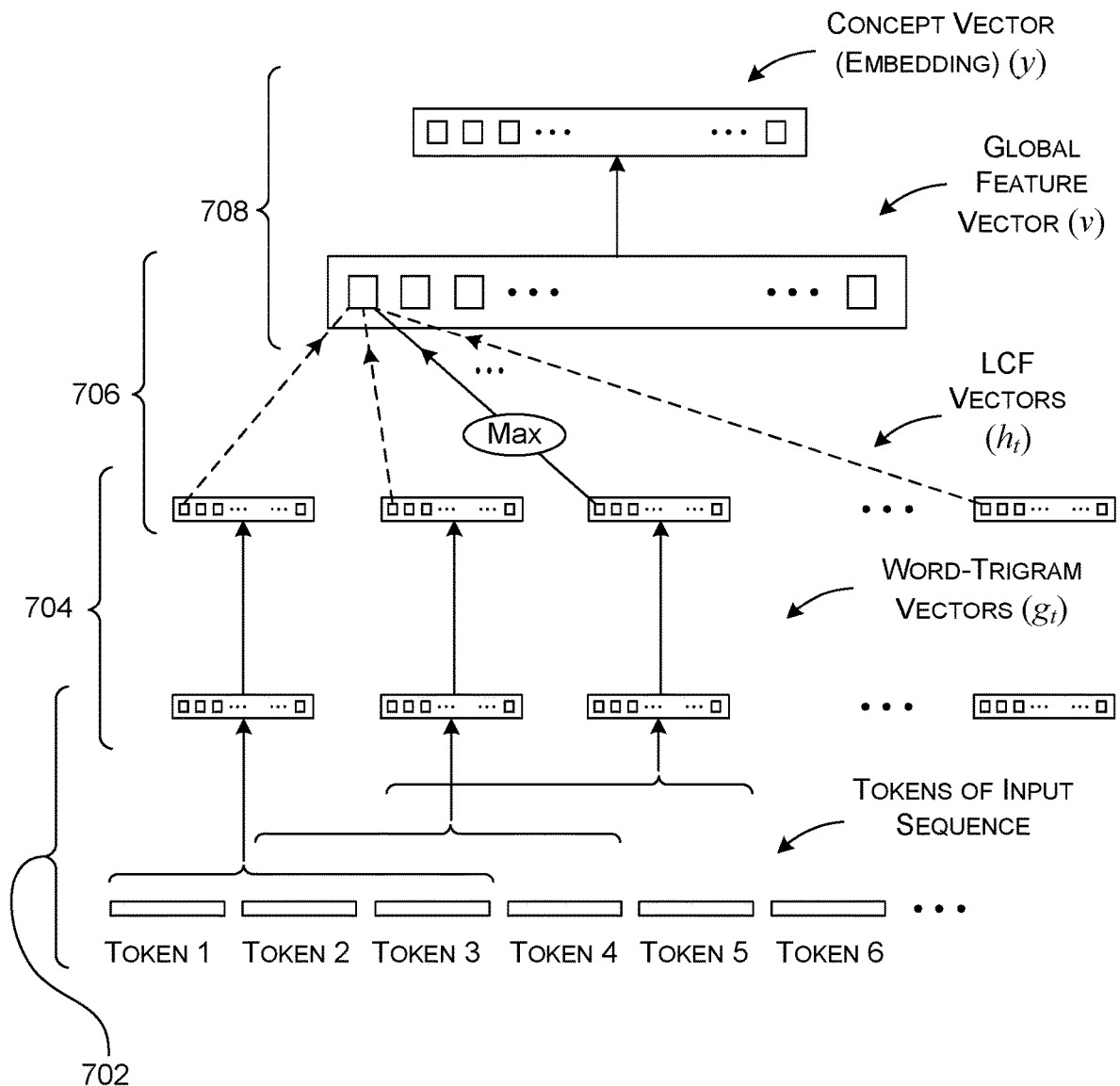
FIG. 7 shows one implementation of a discriminator component, which is a part of the GAN system of FIG. 6.

The architecture and operation of the first CNN 602 will be described below with reference to FIGS. 6 and 7. That is, FIG. 6 shows the components which compose the first CNN 602, while FIG. 7 shows an example of information provided at different stages of processing of the CNN 602. The second CNN 604 has the same architecture and parameter values D(θ) as the first CNN 602. Hence, the description of the first CNN 602 applies with equal relevance to the second CNN 604. But in other implementations, the first and second CNNs (602, 604) can have different architectures and/or different sets of parameter values.

Assume that the query processed by the first CNN 602 includes plural words, corresponding to respective query tokens. For example, the query may read: "Toyota Prius Prime, used, low mileage." The query tokens include "Toyota," "Prius," "Prime," "used," "low," and "mileage."

As a first operation, a convolution component 608 can produce a series of input vectors, each denoted by $g_t$. The convolution component 608 can perform this operation in different ways. In a first approach, the convolution component 608 can first append special tags (e.g., the tag <s>) to the start and end of the query. The convolution component 608 can then express each word in letter-trigram vector form by moving a three-letter window across each word. For example, the convolution component can express the second query token as a vector which specifies the presence of the following letter-trigrams: "Pri," "riu," and "ius."

The convolution component 608 then forms word-trigram vectors from the letter-trigram vectors by moving a three-word window across the query as a whole. For example, the convolution component 608 can form word-trigram vectors for the following combinations of words: "<s>, Toyota, Prius," "Toyota, Prius, Prime," "Prius, Prime, used," and so on. More specifically, the convolution component 608 can form each such word-trigram vector $g_t$ by concatenating (or adding) the three letter-trigram vectors associated with a corresponding three-word window. For example, the convolution component 608 can form the word-trigram vector for the three-word window "Toyota, Prius, Prime" by concatenating the letter-trigram vectors of "Toyota," "Prius," and "Prime." Alternatively, the convolution component 608 can move a three-letter window across the entire sequence "Toyota Prius Prime" to form the word-trigram vector, without forming separate letter-trigrams for the three words.

In a second approach, the convolution component 608 forms each word-trigram vector $g_t$ based on a consideration of unique words in a window, rather than three-letter combinations. For example, the word-trigram vector may have a dimensionality equal to a total number of the most commonly occurring word-unigrams (single words), word-bigrams (two-word combinations), and word-trigrams (three-word combinations) in a natural language, with each slot of that vector associated with a particular word combination. The convolution component 608 can set a value m for each slot that identifies the number of times a word combination associated with that slot appears in the three-word window. For example, the convolution component 608 can form a word-trigram vector for the three-word window "Toyota, Prius, Prime" by setting a "1" entry in the three slots associated with the single words "Toyota," "Prius," and "Prime," and a "1" entry for the two-word combination "Toyota Prius," and a "1" entry for the three-word combination "Toyota Prius Prime," etc.

In a third approach, the convolution component 608 maps any initial vector representation of the three words in the three-word window to a low-dimensionality word-trigram vector $g_t$, e.g., using any machine-learned model, such as a neural network.

The above-described three approaches are set forth by way of illustration, not limitation. Further note that the convolution component 608 can generate input vectors for windows having any number of words, not necessarily three words.

Next, the convolution component 608 transforms each word-trigram vector ($g_t$) into a local contextual feature (LCF) vector ($h_t$), using a machine-learned matrix $W_c$, referred to herein as a convolution matrix. This operation yields a series of T local contextual feature (LCF) vectors. More specifically, the convolution component 608 may compute a particular LCF vector $h_t$ as:

$$h_t = \tan h(W_c \cdot g_t) \quad (6)$$

The tan h function constitutes one particular activation function, and is given by:

$$\tanh(x) = \frac{1 - e^{-2x}}{1 + e^{-2x}}. \quad (7)$$

In a next phase of operation, a max-pooling component 610 forms a single global feature vector v by pulling respective maximum values from the LCF vectors. More specifically, consider the first element of the global feature vector v, corresponding to the first dimension of that vector. The max-pooling component 610 identifies the values expressed by the corresponding first elements of the LCF vectors, and then selects the maximum value among those values. The max-pooling component 610 then inserts that maximum value into the first element of the global feature vector v. More formally stated, the values of the global feature vector can be computed by the equation:

$$v(i) = \max_{t=1,...T} \{h_t(i)\}, i = 1, ... K. \quad (8)$$

Here, i refers to a particular element and a particular dimension in the global feature vector v, and, correspondingly, in each of the T LCF vectors, $h_t$. K is the total number of elements (and dimensions) in the global feature vector.

Finally, a projection component 612 projects the global feature vector v into a continuous-valued concept vector y (also referred to as an embedding) using a machine-learned semantic projection matrix $W_s$. More specifically, the projection component 612 may generate the first vector $y_q$ using the following equation:

$$y_q = \tan h(W_s \cdot v) \quad (9).$$

The tan h function corresponds to the same activation function expressed by Equation (7). In other implementations, the projection component 612 produces the concept vector y by transforming the global feature vector v using one or more additional intermediate neural network layers (not shown).

In one implementation, the classification component 606 then computes the similarity between the first vector $y_q$ (produced by the first CNN 602) and the second vector $y_k$ (produced by the second CNN 604), e.g., using the following cosine similarity equation:

$$S(q, k) = \text{cosine}(y_q, y_k) = \frac{y_q \cdot y_k}{\|y_q\| \|y_k\|}. \quad (10)$$

The similarity score S(q, k) reflects the similarity or closeness between the query and the key term in the low-dimensionality semantic space. The classification component 606 can compare the similarity score with an environment-specific threshold to determine whether the pairing of q and k is a valid pairing.

FIG. 7 summarizes the operations described above. In operation 702, the convolution component 608 transforms the sequence of input tokens into a plurality of word-trigram vectors ($g_t$). In operation 704, the convolution component 608 transforms the word-trigram vectors into LCF vectors ($h_t$). In operation 706, the max-pooling component 610 transforms the LCF vectors into the global feature vector v. In operation 708, the projection component 612 transforms the global feature vector into the concept vector y.

In conclusion to Section A, the computing environment 102 of FIG. 1 has various characteristics that contribute to the efficient matching of queries to key terms. For example, consider an illustrative first reference system R1 which operates by comparing a query with a data store of actual bid key terms. The smart-matching system 306 described herein generates key terms from "scratch," and hence does not require comparing the query with actual bid key terms. For this reason, the ad-serving system 128 described herein can be expected to deliver ads in a more expeditious manner than the reference system R1, e.g., presuming that the lexical-matching system 302 of FIG. 3 is omitted, or its role is minimized.

Consider a second reference system R2 that involves mining a historical log of query-key term pairs. The ad-serving system 128 described herein does not require such a log, and therefore can eliminate the storage resources used to store the log, and the time required to process the information contained therein.

Moreover, the generator component 110 generates high-quality key terms by virtue of the fact that the generator component 110 is trained by the GAN system 112. This enables the ad-serving system 128 to generate highly relevant ads. The presentation of relevant ads benefits the end user because the end user receives ads that are likely to interest him or her. The presentation of relevant ads benefits the advertiser because it promotes the advertiser's ad campaign objective, e.g., by increasing exposure to its product or service. The presentation of relevant ads benefits the entity which administers the ad-serving system 128 because the entity will receive an increase in revenue when users click on the ads.

Note that the generator component 110 was described above as providing an output result (a fake key term) in a manner that is conditioned on a query q. In addition, or alternatively, the generator component 110 can take into account other contextual factors associated with the user's submission of a query, and/or other characteristics of the query besides its text. For instance, the generator component 110 can take into account the classification of the words in a query, e.g., as computed by a Conditional Random Field (CRF) model or some other technique.

B. Illustrative Processes

Figure 8:
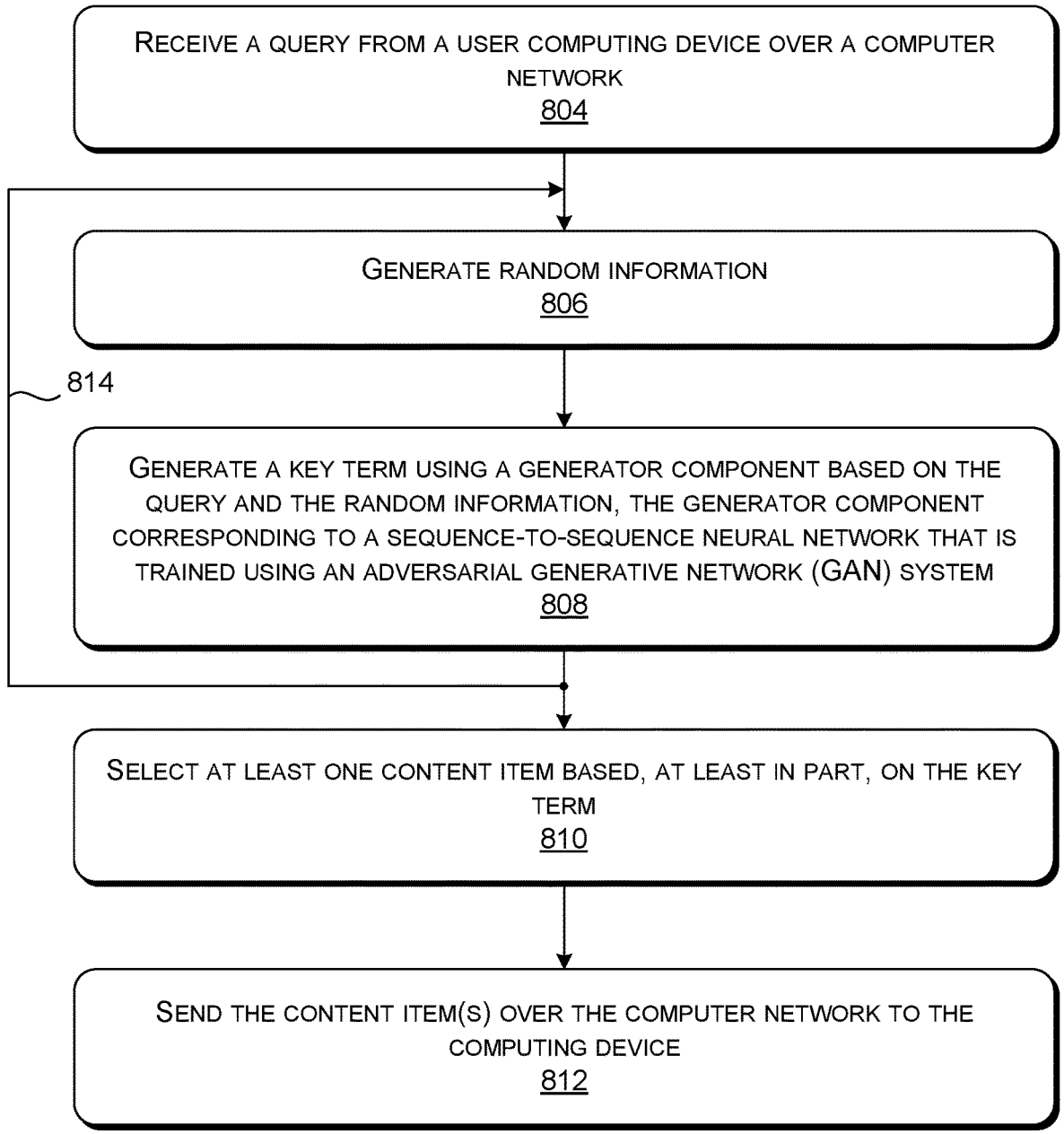
FIG. 8 is a flowchart that shows one manner of operation of the ad-serving system of FIG. 3.
Figure 9:
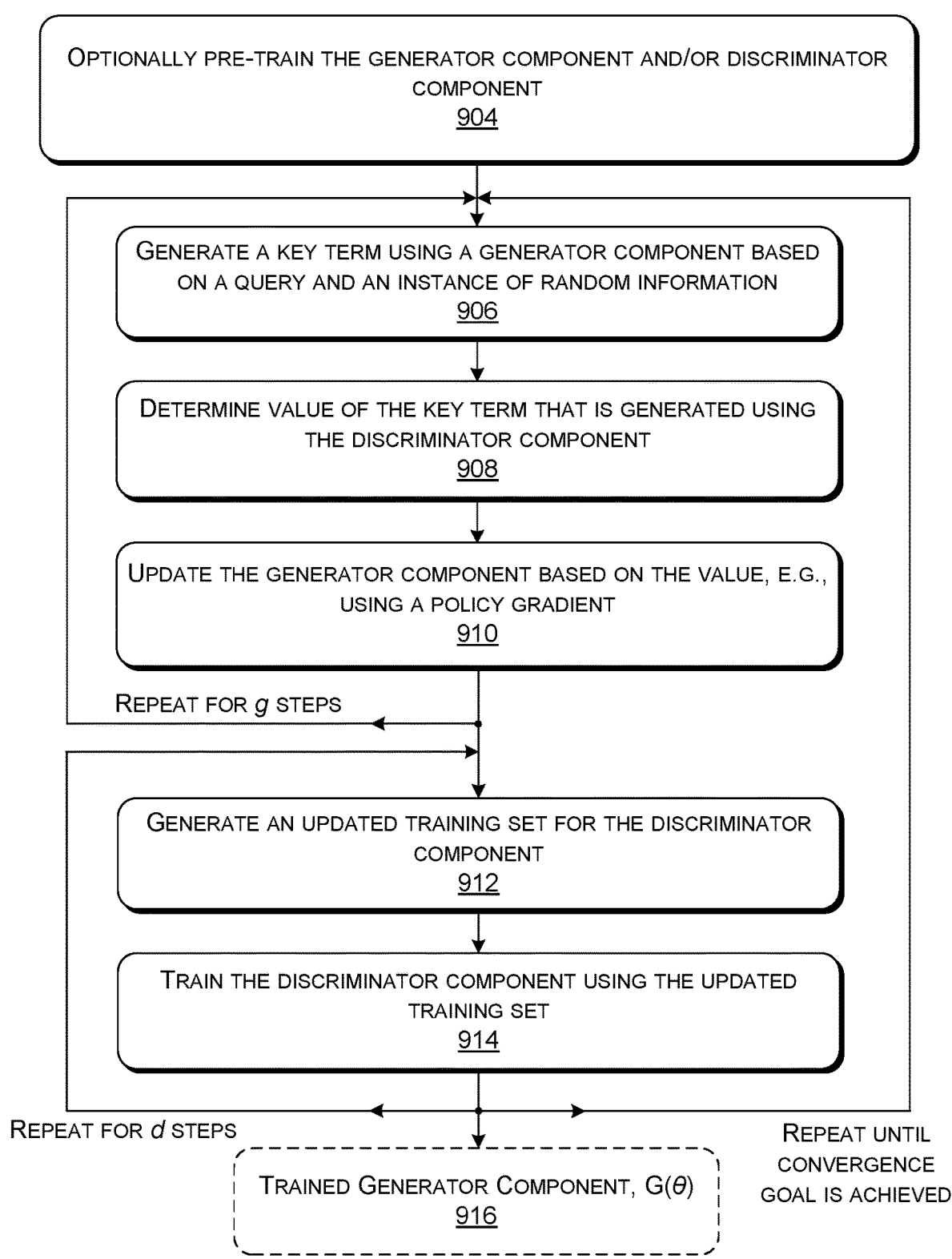
FIG. 9 is a flowchart that shows one manner of operation of a training system, which is a component of the training framework of FIG. 1.

FIGS. 8 and 9 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Beginning with FIG. 8, this figure shows a process 802 that describes one manner of operation of the ad-serving system 128 of FIG. 1. More generally, however, the process 802 applies to any search system that delivers any kind of content items to users by performing a query-to-key-term matching operation—not necessarily an ad-related system.

In block 804, the ad-serving system 128 receives a query from a user computing device over the computer network 208, wherein a user operates the user computing device. In block 806, the ad-serving system 128 generates random information. In block 808, the ad-serving system 128 generates a key term using the generator component 110 based on the query (as a condition) and the random information. The generator component 110 corresponds to a sequence-to-sequence neural network that is trained using the adversarial generative network (GAN) system 112. In block 810, the ad-serving system 128 selects at least one content item based, at least in part, on the key term. In block 812, the ad-serving system 128 sends the content item(s) over the computer network 208 to the user computing device. The loop 814 indicates that the ad-serving system 128 can repeat blocks 806 and 808 one or more times to generate one or more addition key terms. That is, the ad-serving system 128 generates a new key term for the same query in response to being fed a new instance of random information.

FIG. 9 shows a process 902 that represents one manner of operation of the training system 116. In one implementation, the training process is governed by the following value function:

$$V(\theta^D, \theta^G) = E_{x \sim p_{data}(x)} \log D(x|q) + E_{z \sim p_z(z)} \log(1 - D(G(z|q))) \quad (11)$$

The symbol $\theta^D$ refers to the parameter values of the discriminator component 114, while the symbol $\theta^G$ refers to the parameter values of the generator component 110. The symbol x refers to a real data item (e.g., a real key term k) fed to the discriminator component 114, selected from a distribution $p_{data}(x)$. The symbol z refers to a random input item fed to the generator component 110, selected from a distribution $p_z(z)$. The symbol $D(x|q)$ refers to the transformation performed by the discriminator component 114 on the real data item to produce a classification result, conditioned on the query q. The symbol $G(z|q)$ refers to the transformation performed by the generator component 110 to provide a "fake" data item (e.g., a fake key term k'), conditioned on the query q. The symbol $D(G(z|q))$ refers to the transformation performed by the discriminator component 114 on the fake data item to provide a classification result, conditioned on the query q. The training process attempts to maximize the value of the first term in Equation (11), while minimizing the second term in Equation (11).

More specifically, the objective for training the discriminator component 114 can be expressed as follows:

$$\theta^D = \underset{\theta^D}{\mathrm{argmax}} V(\theta^D, \theta^G) = \underset{\theta^D}{\mathrm{argmax}} (E_{x \sim p_{data}(x)} \log D(x|q) + E_{z \sim p_z(x)} \log(1 - D(G(z|q)))). \quad (12)$$

The objective for training the generator component 110 can be expressed as follows:

$$\theta^G = \underset{\theta^G}{\mathrm{argmax}} V(\theta^D, \theta^G) = \underset{\theta^G}{\mathrm{argmax}} (E_{z \sim p_z(z)} \log D(G(z|q))). \quad (13)$$

Now referring to the steps in the process 902, in block 904, the training system 116 can optionally pre-train the generator component 110 and/or the discriminator component 114. For example, the training system 116 can pre-train the generator component 110 using Maximum Likelihood Estimation (MLE). Pre-training may improve the ability of the training system 116 to generate accurate models. For example, without MLE pre-training, the generator component 110 may commence its learning at a bad starting point, leading to its failure to learn the distribution of the real data items, $p_{data}(x)$.

In blocks 906, 908, and 910, the training system 116 trains the generator component 110 for g steps using a reinforcement learning technique. That is, in block 906, the generator component 110 generates a fake key term based on an input query and an instance of random information. In block 908, the discriminator component 114 determines whether the key term generated in block 906 is real or fake. The output of the discriminator component 114 in block 908 provides a value of the action taken by the discriminator component 114 in block 906. In block 910, the training system 116 updates the parameter values of the generator component 110 based on the result obtained by the discriminator component in block 908. For instance, the training system 116 can update the parameter values of the generator component 110 using a policy gradient technique. In this context, the parameter values of the generator component 110 constitute the policy to be learned by the reinforcement learning technique.

In blocks 912 and 914, the training system 116 trains the discriminator component 114 for d steps. That is, in block 912, the training system 116 generates an updated training set for use in training the discriminator component 114. The training set can include pairings of real queries and real key terms (e.g., obtained from a historical log), pairings of real queries and fake key terms (in which the fake key terms are obtained from the most up-to-date version of the generator component 110), and optional pairings of fake queries and real key terms. In block 914, the training system 116 trains the discriminator component 114 using the updated training set prepared in block 912.

The training system 116 can repeat the above-described two phases of training (in blocks 906-910 and blocks 912-914) until the GAN system 112 reaches a desired performance objective. The training system 116 then delivers a fully-trained generator component 916 to the ad-serving system 128. Optimally, the fully-trained generator component 916 produces fake key terms that are virtually indistinguishable from real key terms, providing that the generator component 916 has adequately learned the real distribution $p_{data}(x)$.

In some implementations it is preferable to purposely decrease the strength of the discriminator component 114 relative to the generator component 110. This is because a discriminator component 114 that is too strong can negatively impact the ability of the generator component 112 to learn the real data distribution. In this context, "strength" refers to the relative ability of the discriminator component 114 to perform its classification task. That is, a weak discriminator component 114 will provide less accurate classification results compared to a stronger discriminator component 114.

The strength of the discriminator component 114 can be weakened by: (a) reducing the number of layers in its convolutional neural network; (b) reducing the expressiveness in the input vectors which are fed to the discriminator component 114; (c) reducing a learning rate of the discriminator component 114 relative to the generator component 110, etc. Note that a word-based word-trigram vector (in which each entry corresponds to a word combination in a three-word window) is less expressive than a letter-based word-trigram vector (in which each entry represents a three-letter combination in the three-word window).

C. A Representative Computing Device

Figure 10:
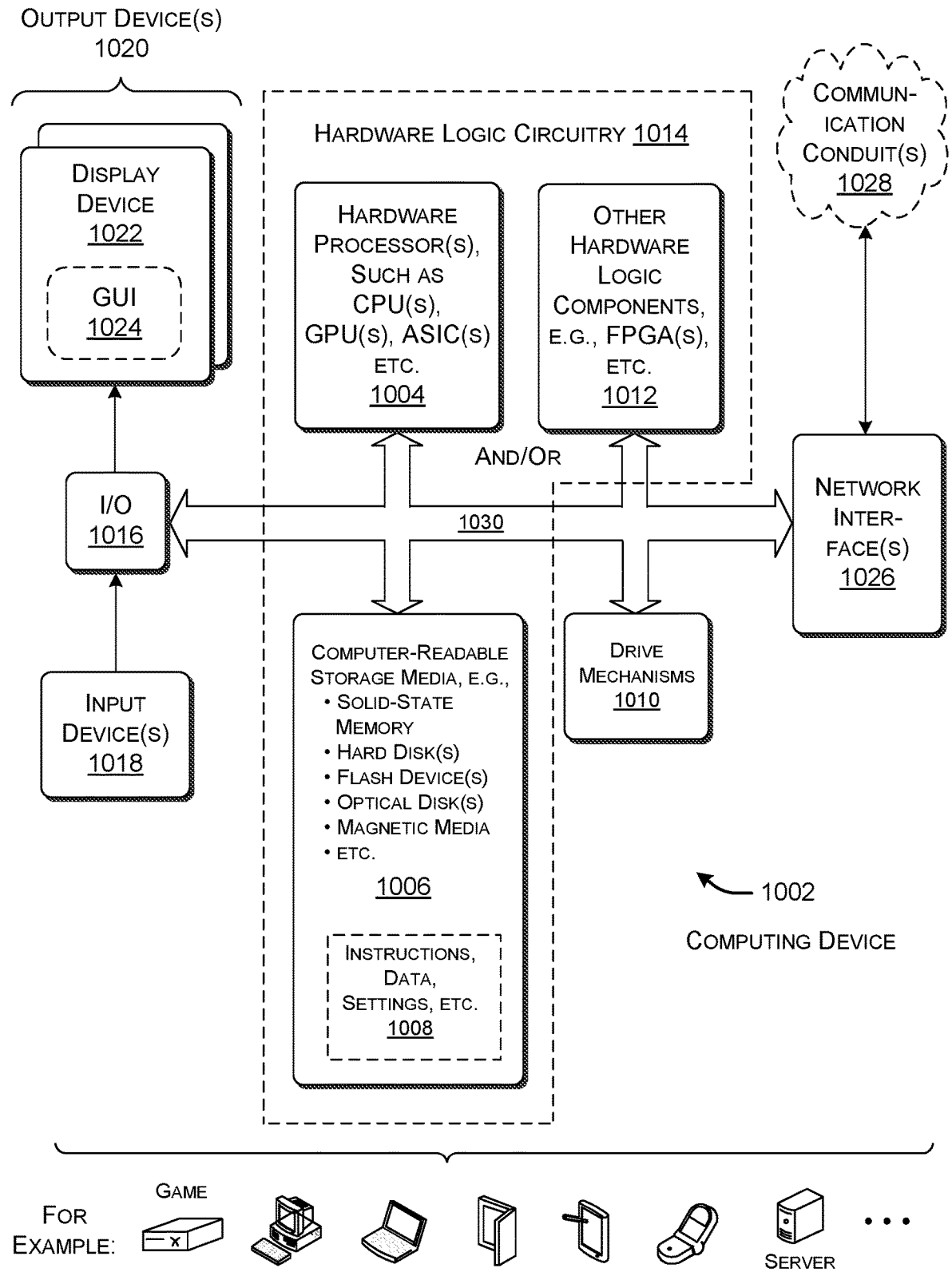
FIG. 10 shows illustrative computing functionality that can be used to implement any aspect of the features shown in the foregoing drawings.

FIG. 10 shows a computing device 1002 that can be used to implement any aspect of the mechanisms set forth in the above-described figures. For instance, the type of computing device 1002 shown in FIG. 10 can be used to implement the servers (204, 206) and/or the user computing devices 104 shown in FIG. 2. In all cases, the computing device 1002 represents a physical and tangible processing mechanism.

The computing device 1002 can include one or more hardware processors 1004. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1002 can also include computer-readable storage media 1006, corresponding to one or more computer-readable media hardware units. The computer-readable storage media 1006 retains any kind of information 1008, such as machine-readable instructions, settings, data, etc. Without limitation, for instance, the computer-readable storage media 1006 may include one or more solid-state devices, one or more flash devices, one or more magnetic hard disks, one or more optical disks, magnetic tape, and so on. Any instance of the computer-readable storage media 1006 can use any technology for storing and retrieving information. Further, any instance of the computer-readable storage media 1006 may represent a fixed or removable component of the computing device 1002. Further, any instance of the computer-readable storage media 1006 may provide volatile or non-volatile retention of information.

The computing device 1002 can utilize any instance of the computer-readable storage media 1006 in different ways. For example, any instance of the computer-readable storage media 1006 may represent a hardware memory unit (such as Random Access Memory (RAM)) for storing transient information during execution of a program by the computing device 1002, and/or a hardware storage unit (such as a hard disk) for retaining/archiving information on a more permanent basis. In the latter case, the computing device 1002 also includes one or more drive mechanisms 1010 (such as a hard drive mechanism) for storing and retrieving information from an instance of the computer-readable storage media 1006.

The computing device 1002 may perform any of the functions described above when the hardware processor(s) 1004 carry out computer-readable instructions stored in any instance of the computer-readable storage media 1006. For instance, the computing device 1002 may carry out computer-readable instructions to perform each block of the processes described in Section B.

Alternatively, or in addition, the computing device 1002 may rely on one or more other hardware logic components 1012 to perform operations using a task-specific collection of logic gates. For instance, the hardware logic component(s) 1012 include a fixed configuration of hardware logic gates, e.g., that are created and set at the time of manufacture, and thereafter unalterable. Alternatively, or in addition, the other hardware logic component(s) 1012 include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 10 generally indicates that hardware logic circuitry 1014 corresponds to any combination of the hardware processor(s) 1004, the computer-readable storage media 1006, and/or the other hardware logic component(s) 1012. That is, the computing device 1002 can employ any combination of the hardware processor(s) 1004 that execute machine-readable instructions provided in the computer-readable storage media 1006, and/or one or more other hardware logic component(s) 1012 that perform operations using a fixed and/or programmable collection of hardware logic gates.

In some cases (e.g., in the case in which the computing device 1002 represents a user computing device), the computing device 1002 also includes an input/output interface 1016 for receiving various inputs (via input devices 1018), and for providing various outputs (via output devices 1020). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1022 and an associated graphical user interface presentation (GUI) 1024. The display device 1022 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1002 can also include one or more network interfaces 1026 for exchanging data with other devices via one or more communication conduits 1028. One or more communication buses 1030 communicatively couple the above-described components together.

The communication conduit(s) 1028 can be implemented in any manner, e.g., by a local area computer network, a wide area computer network (e.g., the Internet), point-to-point connections, etc., or any combination thereof. The communication conduit(s) 1028 can include any combination of hardwired links, wireless links, routers, gateway functionality, name servers, etc., governed by any protocol or combination of protocols.

FIG. 10 shows the computing device 1002 as being composed of a discrete collection of separate units. In some cases, the collection units may correspond to discrete hardware units provided in a computing device chassis having any form factor. FIG. 10 shows illustrative form factors in its bottom portion. In other cases, the computing device 1002 can include a hardware logic component that integrates the functions of two or more of the units shown in FIG. 1. For instance, the computing device 1002 can include a system on a chip (SoC or SOC), corresponding to an integrated circuit that combines the functions of two or more of the units shown in FIG. 10.

The following summary provides a non-exhaustive list of illustrative aspects of the technology set forth herein.

According to a first aspect, one or more computing devices are described for providing a content item to a user. The computing device(s) includes hardware logic circuitry implemented by: (a) one or more hardware processors that execute machine-readable instructions stored in a memory, and/or by (b) one or more other hardware logic components that perform operations using a task-specific collection of logic gates. The hardware logic circuitry includes: an interface component configured to receive a query from a user computing device over a computer network, the user computing device operated by the user; a random noise generator configured to generate random information; a generator component configured to generate a key term based on the query and the random information, the generator component corresponding to a sequence-to-sequence neural network that is trained using an adversarial generative network (GAN) system; a selection component configured to select at least one content item based, at least in part, on the key term; and a delivery component configured to send the content item(s) over the computer network to the user computing device.

According to a second aspect, the random noise generator is configured to generate new random information, and the generator component is configured to generate a new key term based on the query and the new random information, the new key term differing from the first-mentioned key term.

According to a third aspect, the sequence-to-sequence neural network includes a plurality of processing units arranged in series, each processing unit corresponding to a long short-term memory (LSTM) unit.

According to a fourth aspect, the sequence-to-sequence neural network includes an encoder and a decoder. The encoder includes a first series of processing units that map the query into an output vector, the output vector representing an encoding result. The decoder includes a second series of processing units that map the output vector into a key term.

According to fifth aspect, the generator component of the fourth aspect uses the random information to modify an input vector that is fed to the encoder.

According to a sixth aspect, the generator component of the fourth aspect uses the random information to modify the output vector provided by the encoder.

According to a seventh aspect, the hardware logic circuitry further includes a verification component that is configured to verify that the key term is a valid match for the query.

According to an eighth aspect, the GAN system includes a discriminator component that receives a candidate query and a candidate key term as input, and which provides, as an output, an indication of whether the candidate key term is a valid match for the candidate query.

According to a ninth aspect, the discriminator component includes a convolutional neural network.

According to a tenth aspect, the discriminator component includes: a first neural network that maps the candidate query into a first vector; a second neural network that maps the candidate key term into a second vector; and a classification component that is configured to provide the indication of whether the candidate key term is a valid match for the candidate query, based on the first vector and the second vector.

According to an eleventh aspect, a method, implemented by one or more computing devices, is described for delivering a content item to a user. The method includes: receiving a query from a user computing device over a computer network, the user computing device being operated by the user; generating random information; generating a key term using a generator component based on the query and the random information, the generator component corresponding to a sequence-to-sequence neural network that is trained using an adversarial generative network (GAN) system; selecting at least one content item based, at least in part, on the key term; and sending the content item(s) over the computer network to the computing device. The receiving, generating random information, generating a key term, selecting, and sending operations are performed by the computing device(s).

According to a twelfth aspect, each content item corresponds to a digital ad.

According to a thirteenth aspect, the method further involves: repeating the generating of random information to provide new random information; and repeating the generating of a key term, to provide a new key term based on the query and the new random information, the new key term differing from the first-mentioned key term.

According to a fourteenth aspect, the sequence-to-sequence neural network of the eleventh aspect includes an encoder and a decoder. The encoder includes a first series of processing units that map the query into an output vector, the output vector representing an encoding result. The decoder includes a second series of processing units that map the output vector into a key term.

According to a fifteenth aspect, the generator component (of the fourteenth aspect) uses the random information to modify an input vector that is fed to the encoder.

According to a sixteenth aspect, the generator component (of the fourteenth aspect) uses the random information to modify the output vector provided by the encoder.

According to a seventeenth aspect, the GAN system of the eleventh aspect includes a discriminator component that receives a candidate query and a candidate key term as input, and which provides, as an output, an indication of whether the candidate key term is a valid match for the candidate query. Further, the discriminator component includes a convolutional neural network.

According to an eighteenth aspect, a computing environment is described for providing a content item to a user. The computing environment includes a search framework that includes one or more computing devices, and a training framework that includes one or more computing devices. Each computing device of the search framework and the training framework includes hardware logic circuitry implemented by: (a) one or more hardware processors that execute machine-readable instructions stored in a memory, and/or by (b) one or more other hardware logic components that perform operations using a task-specific collection of logic gates. The hardware logic circuitry of the search framework includes: an interface component configured to receive a query from a user computing device over a computer network, the user computing device being operated by the user; a random noise generator configured to generate random information; a generator component configured to generate a key term based on the query and the random information, the generator component corresponding to a sequence-to-sequence neural network that is trained using an adversarial generative network (GAN) system; a selection component configured to select at least one content item based, at least in part, on the key term; and a delivery component configured to send the content item(s) over the computer network to the user computing device. The hardware logic circuitry of the training framework includes: the GAN system, wherein the GAN system includes the generator component in combination with a discriminator component. The discriminator component is configured to receive a candidate query and a candidate key term as input, and provide, as an output, an indication of whether the candidate key term is a valid match for the candidate query. The hardware logic circuitry of the training framework also includes a training system configured to train the generator component to successively increase an ability of the generator component to generate candidate key terms that are judged by the discriminator component to be true key terms, and to successively increase an ability of the discriminator component to judge between false key terms and true key terms.

According to a nineteenth aspect, the sequence-to-sequence neural network (mentioned in the eighteenth aspect) includes an encoder and a decoder. The encoder includes a first series of processing units that map the query into an output vector, the output vector representing an encoding result. The decoder includes a second series of processing units that map the output vector into a key term. Further, the generator component uses the random information to modify an input vector that is fed to the encoder and/or the output vector provided by the encoder.

According to a twentieth aspect, the discriminator component mentioned in the nineteenth aspect includes a convolutional neural network.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. One or more computing devices for providing a content item to a user, comprising:
hardware logic circuitry implemented by: (a) one or more hardware processors that execute machine-readable instructions stored in a memory, and/or by (b) one or more other hardware logic components that perform operations using a task-specific collection of logic gates, the hardware logic circuitry including:
an interface component configured to receive a query from a user computing device over a computer network, the user computing device operated by the user;
a random noise generator configured to generate random information;
a generator component configured to generate a synthetic key term based on the query and the random information, the generator component corresponding to a sequence-to-sequence neural network that is trained using an adversarial generative network (GAN) system;
a selection component configured to select at least one content item based, at least in part, on the key term; and
a delivery component configured to send said at least one content item over the computer network to the user computing device.

2. The one or more computing devices of claim 1, wherein the random noise generator is configured to generate new random information, and
wherein the generator component is configured to generate a new key term based on the query and the new random information, the new key term differing from the first-mentioned key term.

3. The one or more computing devices of claim 1, wherein the sequence-to-sequence neural network includes a plurality of processing units arranged in series, each processing unit corresponding to a long short-term memory (LSTM) unit.

4. The one or more computing devices of claim 1,
wherein the sequence-to-sequence neural network includes an encoder and a decoder,
wherein the encoder includes a first series of processing units that map the query into an output vector, the output vector representing an encoding result, and
wherein the decoder includes a second series of processing units that map the output vector into a key term.

5. The one or more computing devices of claim 4, wherein the generator component uses the random information to modify an input vector that is fed to the encoder.

6. The one or more computing devices of claim 4, wherein the generator component uses the random information to modify the output vector provided by the encoder.

7. The one or more computing devices of claim 1, wherein the hardware logic circuitry further includes a verification component that is configured to verify that the key term is a valid match for the query.

8. The one or more computing devices of claim 1, wherein the GAN system includes a discriminator component that receives a candidate query and a candidate key term as input, and which provides, as an output, an indication of whether the candidate key term is a valid match for the candidate query.

9. The one or more computing devices of claim 8, wherein the discriminator component includes a convolutional neural network.

10. The one or more computing devices of claim 8, wherein the discriminator component includes:
a first neural network that maps the candidate query into a first vector;
a second neural network that maps the candidate key term into a second vector; and
a classification component that is configured to provide the indication of whether the candidate key term is a valid match for the candidate query, based on the first vector and the second vector.

11. A method, implemented by one or more computing devices, for delivering a content item to a user, comprising:
receiving a query from a user computing device over a computer network, the user computing device being operated by the user;
generating random information;
generating a synthetic key term using a generator component based on the query and the random information, the generator component corresponding to a sequence-to-sequence neural network that is trained using an adversarial generative network (GAN) system;
selecting at least one content item based, at least in part, on the key term; and
sending said at least one content item over the computer network to the computing device,
said receiving, said generating random information, said generating a key term, said selecting, and said sending being performed by said one or more computing devices.

12. The method of claim 11, wherein each content item corresponds to a digital ad.

13. The method of claim 11, wherein the method further involves:
repeating said generating of random information to provide new random information; and
repeating said generating of a key term, to provide a new key term based on the query and the new random information, the new key term differing from the first-mentioned key term.

14. The method of claim 11,
wherein the sequence-to-sequence neural network includes an encoder and a decoder,
wherein the encoder includes a first series of processing units that map the query into an output vector, the output vector representing an encoding result, and
wherein the decoder includes a second series of processing units that map the output vector into a key term.

15. The method of claim 14, wherein the generator component uses the random information to modify an input vector that is fed to the encoder.

16. The method of claim 14, wherein the generator component uses the random information to modify the output vector provided by the encoder.

17. The method of claim 11,
wherein the GAN system includes a discriminator component that receives a candidate query and a candidate key term as input, and which provides, as an output, an indication of whether the candidate key term is a valid match for the candidate query, and
wherein the discriminator component includes a convolutional neural network.

18. A computing environment for providing a content item to a user, comprising:
a search framework that includes one or more computing devices; and
a training framework that includes one or more computing devices,
each computing device of the search framework and the training framework including hardware logic circuitry implemented by: (a) one or more hardware processors that execute machine-readable instructions stored in a memory, and/or by (b) one or more other hardware logic components that perform operations using a task-specific collection of logic gates,
the hardware logic circuitry of the search framework including:
an interface component configured to receive a query from a user computing device over a computer network, the user computing device being operated by the user;
a random noise generator configured to generate random information;
a generator component configured to generate a synthetic key term based on the query and the random information, the generator component corresponding to a sequence-to-sequence neural network that is trained using an adversarial generative network (GAN) system;
a selection component configured to select at least one content item based, at least in part, on the key term; and
a delivery component configured to send said at least one content item over the computer network to the user computing device; and
the hardware logic circuitry of the training framework including:
the GAN system, wherein the GAN system includes the generator component in combination with a discriminator component,
the discriminator component being configured to receive a candidate query and a candidate key term as input, and provide, as an output, an indication of whether the candidate key term is a valid match for the candidate query; and
a training system configured to train the generator component to successively increase an ability of the generator component to generate candidate key terms that are judged by the discriminator component to be true key terms, and to successively increase an ability of the discriminator component to judge between false key terms and true key terms.

19. The computing environment of claim 18,
wherein the sequence-to-sequence neural network includes an encoder and a decoder,
wherein the encoder includes a first series of processing units that map the query into an output vector, the output vector representing an encoding result,
wherein the decoder includes a second series of processing units that map the output vector into a key term, and
wherein the generator component uses the random information to modify an input vector that is fed to the encoder and/or the output vector provided by the encoder.

20. The computing environment of claim 18, wherein the discriminator component includes a convolutional neural network.

21. The one or more computing devices of claim 1,
wherein said at least one content item corresponds to at least one digital ad,
wherein the hardware logic circuitry further includes a data store that stores candidate ad information, including digitals ads and key terms associated therewith, and
wherein the selection component is configured to select said at least one digital ad by finding at least one digital ad in the data store that has an associated key term that matches the key term generated by the generator component.

22. The one or more computing devices of claim 21, wherein the hardware logic circuitry includes a bidding system that is configured to associate the key terms with the digital ads.

23. The method of claim 17, wherein the method further includes lowering a level of accuracy of the discriminator component relative to the generator component to improve learning by the generator component.

* * * * *